Dec. 30, 1969　　　　　E. STREETER　　　　3,486,816
APPROACH AID DISPLAY SYSTEM
Filed March 27, 1967　　　　　　　　　　7 Sheets-Sheet 1

INVENTOR.
EDWARD STREETER,
BY
Walter J. Adam
ATTORNEY.

Dec. 30, 1969  E. STREETER  3,486,816
APPROACH AID DISPLAY SYSTEM
Filed March 27, 1967  7 Sheets-Sheet 2

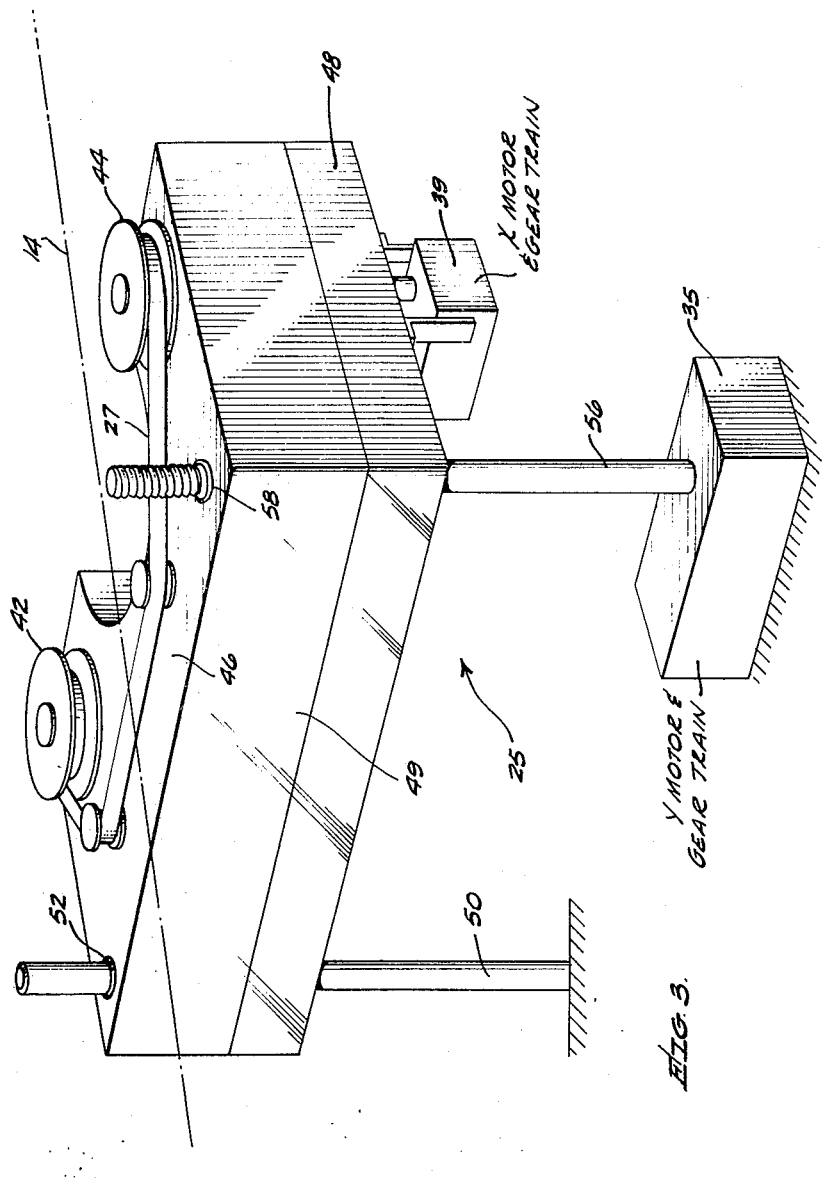

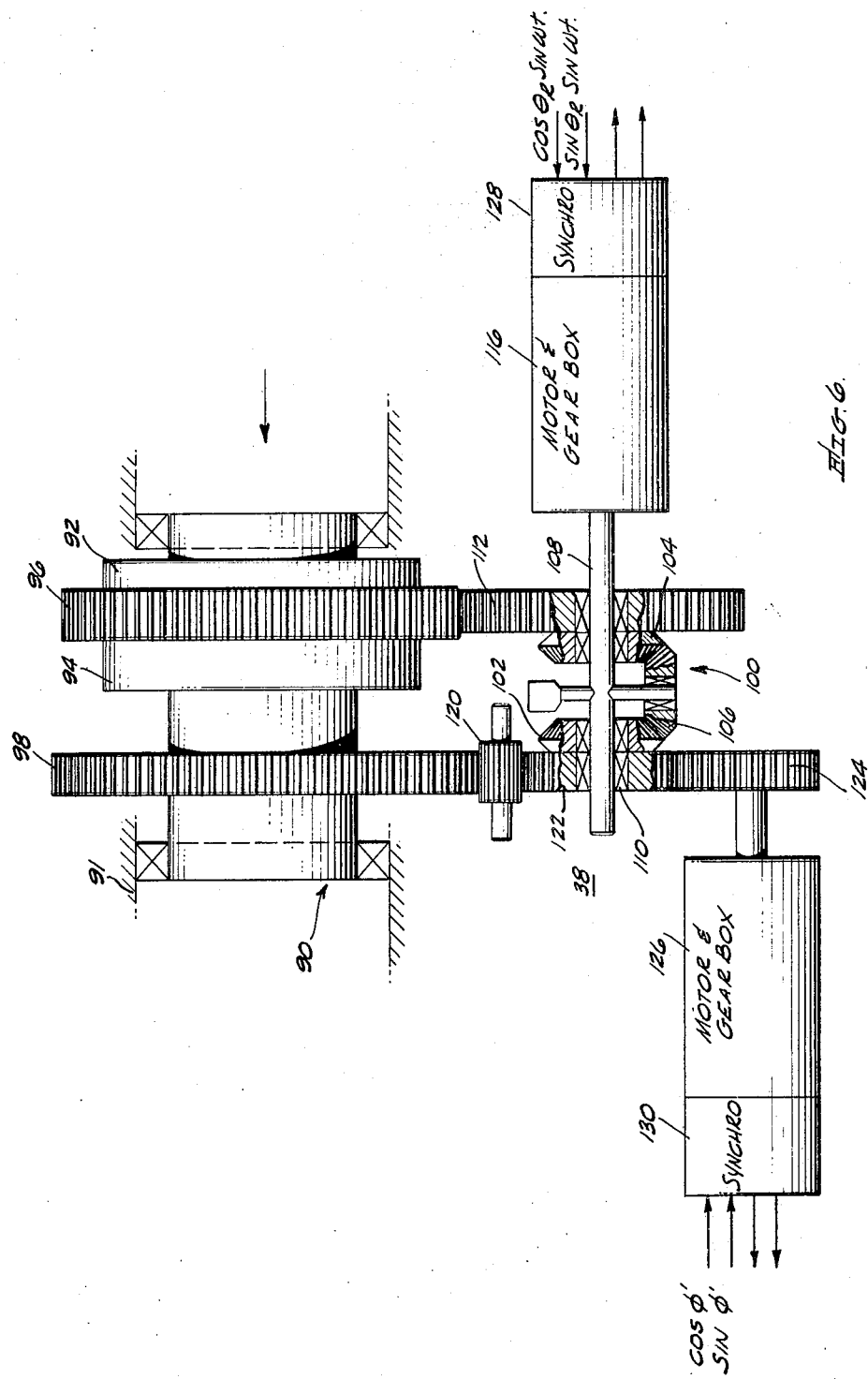

Dec. 30, 1969    E. STREETER    3,486,816
APPROACH AID DISPLAY SYSTEM
Filed March 27, 1967    7 Sheets-Sheet 6

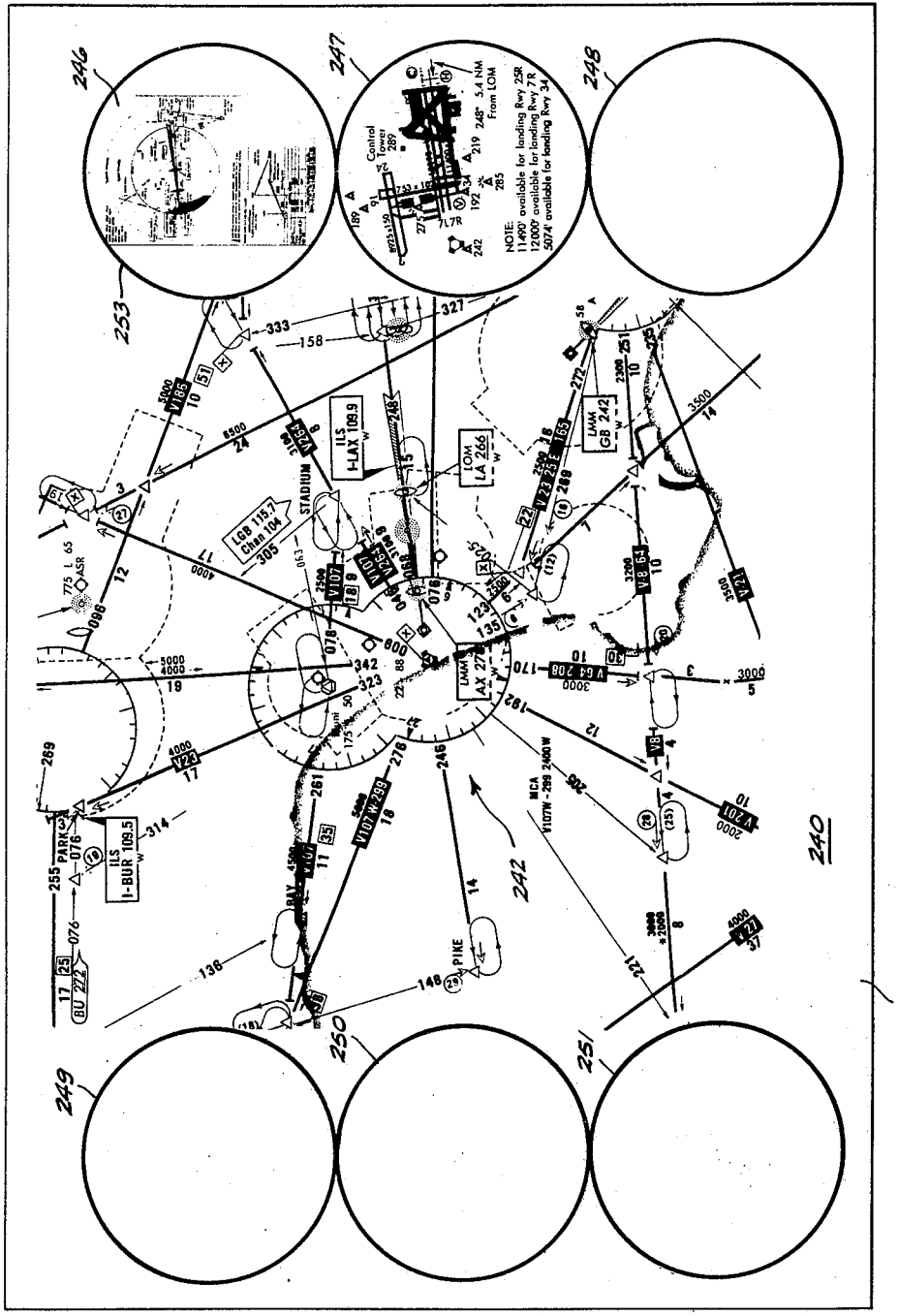

United States Patent Office 3,486,816
Patented Dec. 30, 1969

3,486,816
APPROACH AID DISPLAY SYSTEM
Edward Streeter, Woodland Hills, Calif., assignor to Hughes Aircraft Company, Culver City, Calif., a corporation of Delaware
Filed Mar. 27, 1967, Ser. No. 626,327
Int. Cl. G03b 21/26
U.S. Cl. 353—11        5 Claims

ABSTRACT OF THE DISCLOSURE

In an aircraft navigation system, when a destination is being approached and a terminal area navigation chart is being presented on a display device, additional approach aid data may be made immediately available for presentation on the same display surface. Aircraft position information is automatically provided by computer control of the position of the chart on the display relative to an aircraft present position symbol. When an approach aid data segment is to be displayed, the operator assumes manual control of the display presentation and manually slews the film to the desired data segment. Control of the display data is retained by the operator until automatic control is again selected. The system provides improved presentation and accessibility of both terminal area navigation charts and additional instrument approach and airport reference data on a single display surface.

Background of the invention

This invention relates to navigation control systems and particularly to an improved display system for selectively providing automatic navigation data and additional reference data such as during a terminal area approach.

In navigation systems such as may be utilized for controlling the flight path between various points, high altitude charts and low altitude charts may be provided for display on pictorial display devices in cross country navigational use. When approaching an airport area, terminal area charts are displayed and in conjunction with aircraft position symbology, provide the operator with current aircraft position information. Conventional chart content includes geographic, airport and radio facility information, but does not include instrument approach and other reference data. Paper charts or books are conventionally utilized as a source of instrument approach data, resulting in considerable operator search and selection requirements in obtaining the reference data. In this conventional system, considerable data is presented on the terminal area chart so that as much information as possible is available to the operator. However, when a large amount of data is included on the terminal area chart, ease of reading becomes relatively difficult. During a landing maneuver, any difficulty in reading chart information and any delay in obtaining necessary information and instrument data may have an effect on the control and operation of the aircraft. A navigation system in which a continuous chart presentation is provided on a display, and in which special approach and airport data such as instrument landing information is immediately available to the operator on the same display and with the same overall format, would be a substantial advance in the navigation art.

Summary of the invention

It is therefore an object of this invention to provide an improved navigation control system.

It is a further object of this invention to provide a navigation display system in which a substantial amount of reference data is readily available for display in addition to area chart presentation with both types of displayed information having the same format.

It is a still further object of this invention to provide a navigation display system in which the frames utilized for information storage contain charts and additional segments of data that may be selected by the operator.

It is another object of this invention to provide an improved navigation system for use during terminal area approaches.

It is still another object of this invention to provide an approach aid display system in which an automatic navigation display is provided with landing data being available on the same display surface by inhibiting the automatic display and manually selecting the landing data segments.

Briefly, the navigation system in accordance with the invention provides a display surface onto which navigation charts are presented by projection of portions of selectable frames or film segments. During automatic flight control, symbols are projected or provided on the display to indicate a desired or commanded flight route and present aircraft position, both relative to the chart presentation. The controlled display may be provided by automatically moving the chart presentation relative to the present position symbol. Each frame of film also includes a plurality of segments or circles of data or information such as reference or approach aid data, with the circles being substantially the same size and format as the projected portion of the chart provided on the display surface. By manual control, the operator slews the chart to a position to project the circle of data and the automatic computer information is inhibited from controlling the display. The operator may selectively return the display to automatic navigation control.

Brief description of drawings

The novel features of this invention, as well as the invention itself, both as to its organization and method of operation, will best be understood from the accompanying description, taken in connection with the accompanying drawings, in which like reference characters refer to like parts, and in which:

FIG. 3 is a perspective drawing of the film position controller and projector utilized in the system of FIG. 1;

FIG. 6 is a schematic diagram of the symbol generator that may be utilized in the system of FIG. 1;

FIG. 13 is a schematic diagram of a frame of the film or information retentive medium that may be utilized in the system of FIG. 1 in accordance with the principles of the invention.

Description of the preferred embodiment

Figure 1:
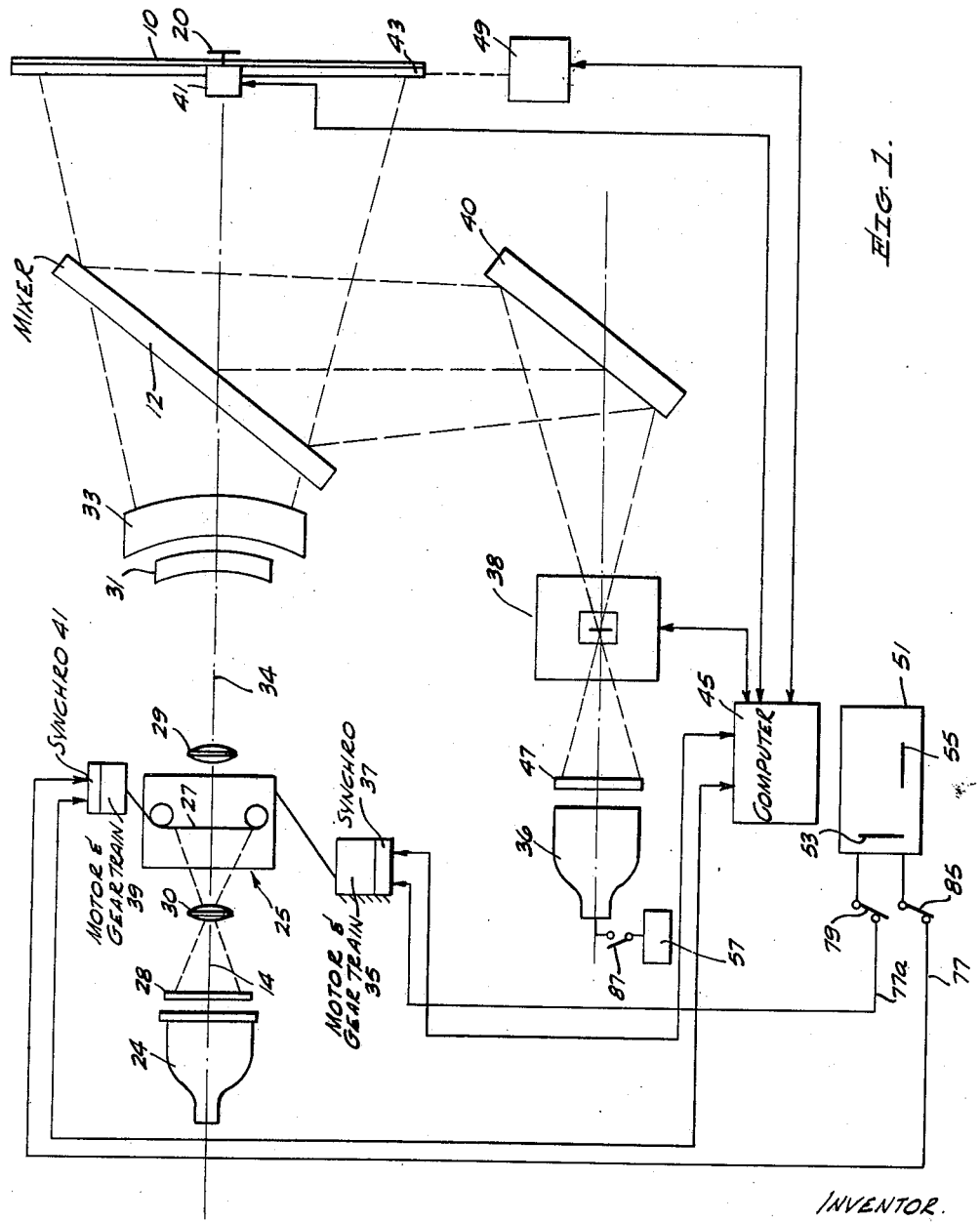
FIG. 1 is a schematic block diagram of a navigation system in accordance with the principles of the invention.
Figure 4:
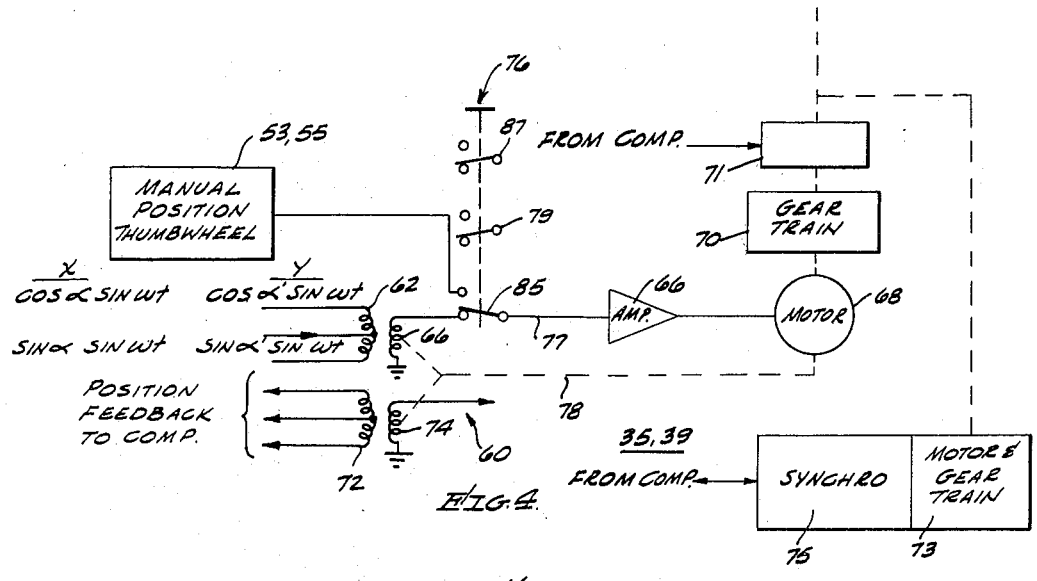
FIG. 4 is a schematic circuit and block diagram of a servo circuit that may be utilized for either the X or Y control of the film position in the system of FIG. 1.

Referring first to the navigation control system of FIG. 1, a screen, display surface or display area 10 receives map or chart projections and symbol projections after mixing or combining in a semi-transparent mirror 12 or other suitable combining structure. A lamp 24 is aligned with an optical axis 14 and applies light through suitable lenses 28 and 30 to a film control projector 25 and through lenses 29, 31 and 33 to the mirror 12. The projector 25 includes a film 27 with the position thereof relative to the axis 14 controlled by X and Y motor and gear trains 35 and 39. A source of control signals such as a computer 45 applies command signals to the synchro circuits 37 and 41 and receives position signals therefrom. A lamp 36 applies light through a lens system 47 and a symbol projector 38 to a mirror 40 where the projection is reflected onto the surface of the semi-reflective mirror 12. The computer 45 controls the symbol generator 38. An aircraft present position symbol 20 may be provided at the screen 10 and rotated in response to a motor and synchro circuit 41 controlled by the computer 45 and a command heading symbol may be provided by a ring 43 controlled by a motor and synchro circuit 49 in response to signals received from the computer 45. The synchro motors 37 and 41 are also controlled by a chart frame selection unit 51 which may have thumbwheels 53 and 55 therein. Switches 79 and 85 respectively couple the thumbwheels 53 and 55 to the leads 77a and 77 for providing manual control of the film position within a selected frame. As will be explained subsequently, the switches 85, 79 and 87 are controlled by a two position switch control 86 (FIG. 4). The switch 87 couples a power source 57 to the lamp 36 to selectively energize or deenergize the lamp 36.

Figure 2:
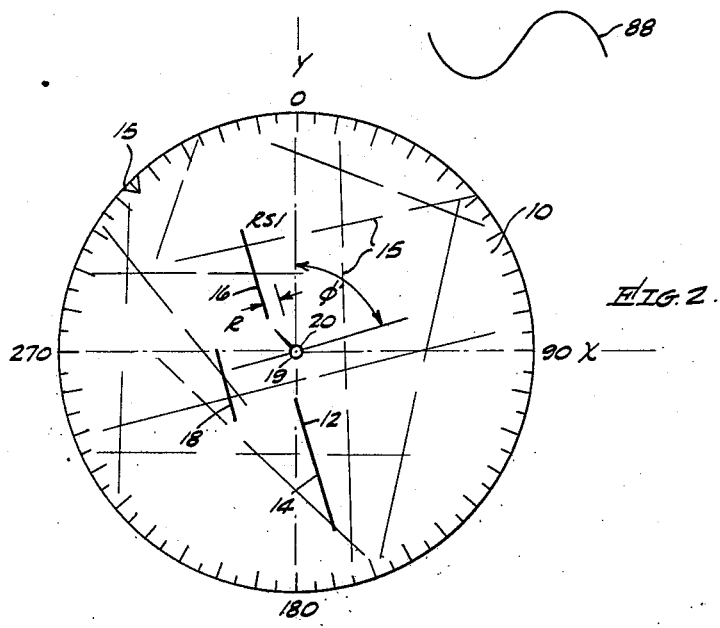
FIG. 2 is a schematic diagram of the screen or display surface that may be utilized in the system of FIG. 1.

Referring now to FIG. 2, the screen 10 is shown with a chart or map projected thereon as indicated at 15 and with the aircraft symbol 20 positioned at the center of the screen. A command heading symbol 15 is shown at a position that may be determined by the ring 43 of FIG. 1. A route segment indicator line 12 may be provided including line 14 and 16 with a gap or hiatus therebetween. A vernier deviation indicator line 18 is shown to provide an amplified presentation of the aircraft position error as present between the symbol 20 and the commanded or desired route segment line 12. To explain the control of the symbols 12 and 18, an X and a Y axis are shown on the screen 10. An angle $\phi'$ defines the direction of pointing of the line 12 representing the desired route. A value R represents the variation of the present aircraft position of the symbol 20 from the commanded route segment of the line 12. The distance between the vernier deviation indicator line 18 and the aircraft symbol 20 is a magnified value of R and may be 5R, or any desired function of R. The parameter R may be a voltage relative to a selected reference level so that the line 12 may be moved to either side of the center symbol 20 without changing the value of $\phi'$. When the present position is coincident with the flight course or route, the deviation indicator line 18 is in the gap at 19 of the line 12 and the ends of the line 18 are contiguous with the line segments 14 and 16, with these lines being at the position of or on the symbol 20.

Referring now also to the perspective view of FIG. 3, the film 27 is retained on spools 42 and 44 suitably mounted on a plate structure 46. A suitable gear train 48 interconnects the spools 42 and 44 so that both rotate an equal amount in either direction. The motor and gear train 39 is coupled to the gear train 48 to control the position of the film 27 in the X dimension. The motor and gear train 39 may be mounted to a structure 54 positioned below the gear train 48 and a structure 43 suitably attached to the plate structure 46. A fixed post 50 is provided with a ball bearing case 52 that is freely movable therealong and mounted to the structure 46. A lead screw 56 is coupled to the motor and gear train 35 which in turn is fixedly mounted on the craft. A ball nut 58 is threaded on the lead screw 56 and mounted on the structure 46 so that rotation of the screw 56 provides movement of the film 27 in the Y direction.

Figure 5:
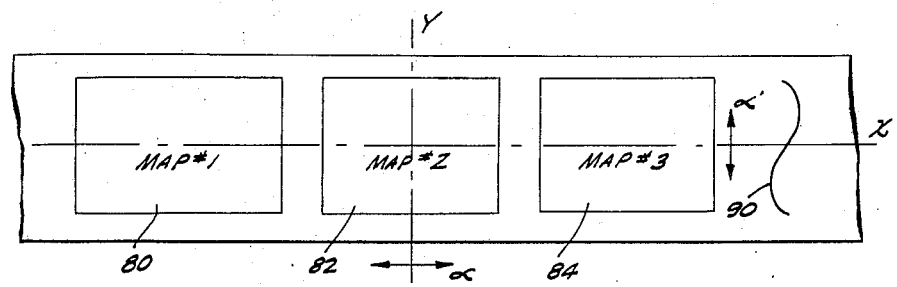
FIG. 5 is a schematic diagram of a portion of the film or information retentive medium that may be utilized in the film holder of FIG. 3.

Referring now also to FIGS. 4 and 5, a resolver 60 includes windings 62 and 64 which apply a signal to a lead 63 and through an amplifier 66 to a motor 68. A gear train 70 responds to the motor 68 and controls, through a clutch 71, the spool 44 or the lead screw 56 depending upon whether the circuit of FIG. 4 is in the motor and gear train circuit 35 to 39. The synchro circuit 60 includes windings 72 and 74, the latter being coupled between ground and a suitable +26 volt source of potential. A mechanical link 78 interconnects the motor 68 and the windings 64 and 74. For operation to control X movement for the unit 39, signals $\cos \alpha \sin \omega_T$ and $\sin \alpha \sin \omega_T$ are applied to the winding 62 and for operation to control the Y movement, signals $\cos \alpha' \sin \omega_T$ and $\sin \alpha' \sin \omega_T$ are applied to the winding 62. The radian frequency of $\omega$ is selected for reliable operation and the angles $\alpha$ and $\alpha'$ represent X and Y positions on the film frame. The manual position thumbwheel circuit 53 to 55 and a switch 85 are provided to control manual movement of the film 27. The two position manual switch structure may include the switch 85 for the Y control, a switch 79 for the X control and the switch 87 for controlling the lamp 36 (FIG. 1). In a first position of the switch 76, all of the switch cotnacts are energized or closed to provide an automatic navigation display and in a second position, all of the contacts are open and the reference data is manually controlled. The winding 72 provides position feedback signals to the computer 45. Operation of this type of synchro circuit is well known in the art and will not be explained in further detail. For changing frames, either automatically or in response to the pilot, a high speed motor and gear train 73 and a synchro circuit 75 respond to the computer 45 which also operates the clutch 71 to disconnect the gear train 70. It is to be noted that the synchros such as 41 and 49 may be similar to that shown in FIG. 4 except only a null voltage such as on the lead 77 at the input of the amplifier 66 is fed back to the computer.

The film 27 may include first, second and third frames 80, 82 and 84 as shown in FIG. 5, each of which is selectable in response to the high speed motor 73. Upon selection of a frame, the computer input signals control the X and Y positions of the map by a combination of the two signals 88 and 90 as determined by the respective values of $\alpha$ and $\alpha'$. It is to be understood that the film in accordance with the invention is not limited to any particular type but may be any suitable information storage medium.

Referring now to FIG. 6 and to the screen 10 of FIG. 2, the angle $\phi'$ is the rotational angle of the indication lines 12 and 18 and the distance R is the distance of the line 12 from the present aircraft position which is the center of the screen in the illustrated system. It is to be noted that the line 18, which is a fixed multiple or function of R, does not have to be separately controlled from the computer in the illustrated system. A projector 90 includes symbol reticles and lenses as will be explained subsequently with the position of the symbol reticles controlled by internal cams 92 and 94. A gear 96 is attached to the cams 92 and 94 controlling the dimension R with the angle of rotation thereof to the segmented line 12 and the distance to the line 18 which is a predetermined multiple or function of R. A gear 98 is mounted on the body of the projector 90 and the angular position thereof determines the angle $\phi'$ which is related to the direction of the commanded navigation route relative to the displayed map. A differential gear structure 100 is provided including bevel gears 102, 104 and a spider gear 106 with the gears 102 and 104 rotatably mounted with bearings on a shaft 108 and the gear 106 rotatably mounted by bearing on a shaft 110 which in turn is fixedly mounted to the shaft 108. A gear 112 meshes with the gear 96 and rotates on the shaft 108 in response to a motor and gear train 116 providing rotation of the bevel gear 104. The gear 98 is controlled through a suitably mounted idler gear 120 by a gear 122 rotatably mounted on the shaft 108 by suitable bearings. A drive gear 124 responds to a motor and gear train 126 to rotate the gear 122, the gear 98 and to rotate the bevel gear 102, the gears 106, 104, 112 and 96 and to control the angle $\phi'$ without changing the value of R, as the structure 90 rotates on a fixed housing structure 91. The bevel gears 102 and 104 are fixedly mounted to respective gears 122 and 112. Rotation of the motor 126 rotates both the gears 96 and 98 to control the angle $\phi'$ and rotation of the motor 116 moves the gear 106 to rotate the gear 104 in a differential action and rotate the gear 112. Suitable synchro circuits 128 and 130 are coupled to respective motor and gear train units 116 and 130 and are each similar to that shown in FIG. 4. The synchro circuit 128 receives signals cos $\theta_R$ sin $\omega\tau$ and sin $\theta_R$ sin $\omega\tau$ from the computer 45 FIG. 1) and supplies postion feedback signals thereto. The value $\theta_R$ is an angle proportional to range. The synchro circuit 130 receives cos $\phi'$ and sin $\phi'$ signals from the computer 45 and supplies position feedback signals thereto.

Figure 7:
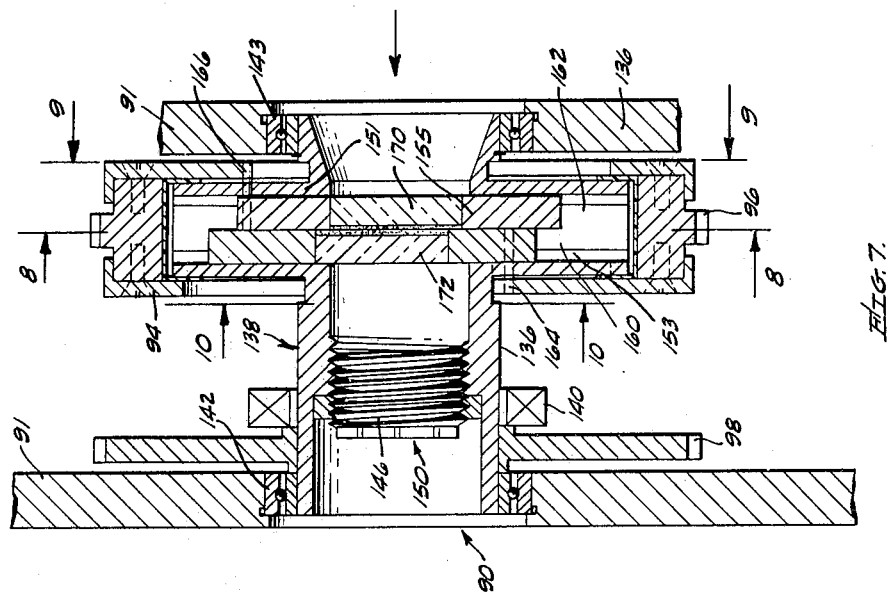
FIG. 7 is a broken away side view of the symbol projecting portion of the symbol generator of FIGS. 1 and 6.

Referring now to FIG. 7, the display control projector 90 includes the housing 91 having a display mechanism as indicated generally at 138 rotatably mounted thereto by suitable ball bearing structures 142 and 143. Thus, the entire mechanism is free to rotate within the housing 91 in response to movement of the gear 98 which is fixedly mounted to an extending structure 136 of the mechanism 138 by an appropriate clamp 140. The gear 96, which is rotatably mounted to the structure 138, also moves with the gear 98 so that the R dimension does not vary with angular movement. Mounted within the cylindrical structure 136 is a lens 146 which in response to the lamp 36 (FIG. 2), results in a light beam being projected through the reticles to the cavities 152 and 150 of the structure 138 and to the display surface. A peripheral flange 151 is provided extending radially outward from the structure 138 and fixedly mounted to a circular flange structure 153 of the structure 138. The flange 151 is generally circular in form and is provided with an elongated cavity or slot 155 which is a slide area for a pair of reticle holders 160 and 162. The reticle holders 160 and 162 are free to move in the elongated cavity 155 and are parallel to the axis thereof. Projecting pins 164 and 166 are provided at the ends of respective reticle holders 160 and 162 and ride on the inner surface of respective internal cams 94 and 92. The reticle holders 160 and 162 may ride on edges provided by rectangular slots 163 and 167 (FIG. 8) at the edge of the slot 155. A coiled spring 171 (FIG. 8) which may be positioned in slot 167, interconnects pins 176 and 178 to bias the reticle holder 160 upward and the reticle holder 162 downward in the side view of FIG. 8. The cams 94 and 92 and the gear 96 are bolted together to form a unit rotatable on a bearing surface 139 provided on the periphery of the flange 153 and the flange 151. The bearing 153 may be a suitable dry lubrication material or a Teflon material as is well known in the art.

Figure 8:
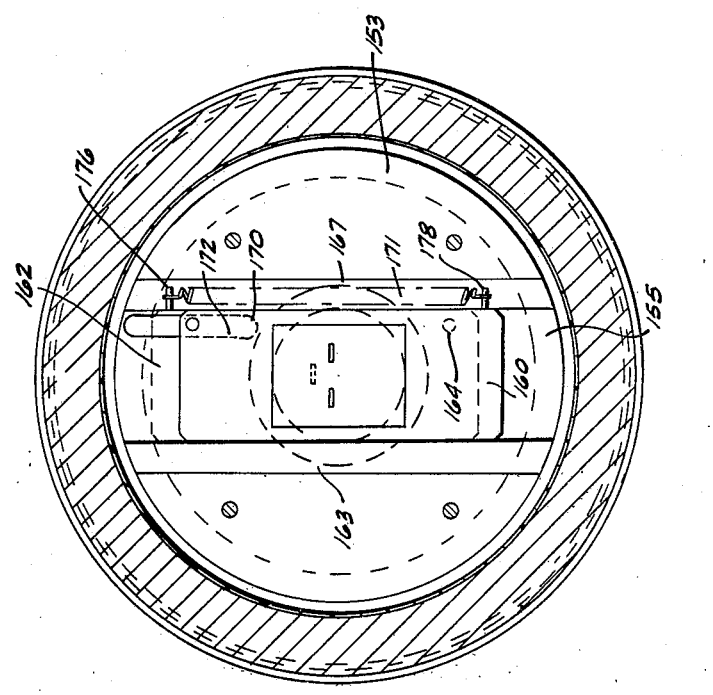
FIG. 8 is a sectional view taken at line 8—8 of FIG. 7.
Figure 11:
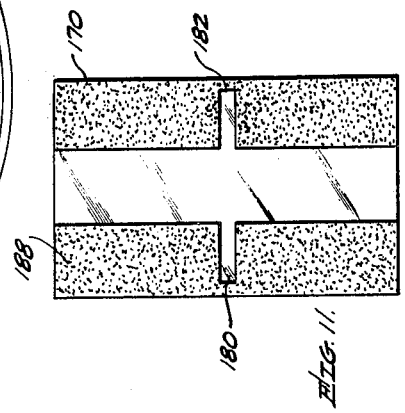
FIG. 11 is a schematic top view of the route segment reticle plate that may be utilized in the symbol projector of FIG. 7.
Figure 12:
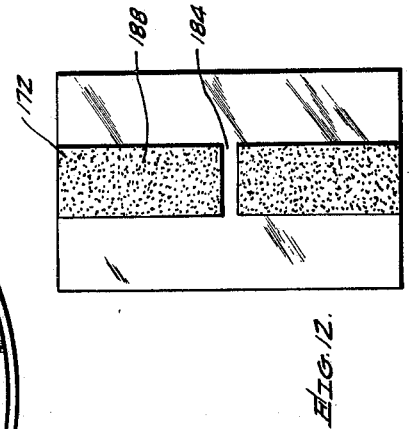
FIG. 12 is a schematic top view of a vernier deviation reticle plate that may be utilized in the symbol projector of FIG. 7.

As shown in FIG. 8, the spring 171 is coupled to pins 176 and 178 in turn mounted on respective plates 162 and 160. The slot 155 of the flange 153 contains the reticle holders 162 and 160, each of which may include a respectice reticle plate 170 and 172. Referring temporarily to FIGS. 11 and 12, the reticle plate 170 includes lines 180 and 182 and the reticle plate 172 includes a line 184. The plates 170 and 172 may be formed of a normally transparent material such as a plastic or glass, having a portion of the surface aluminized as at 188 to render it opaque. The clear areas of lines 180 and 182 and 184 pass light therethrough to define the route segment and vernier deviation lines. The plates 170 and 172 when in surface abutting juxtaposition, may be moved so that the slot 184 is longitudinally aligned between the transparent slots or lines 180 and 182. If desired, the reticle plates may be inserted into the holders so that the surface is not worn during movement. Thus, as the reticle holders 160 and 162 move longitudinally in the cavity 152 to a central point, the slot 184 may be contiguously aligned with the slots 180 and 182 to present in the plane of projection, a continuous line accommodating the passage of light therethrough. The light passing through the slots 180 and 182 when projected to the view screen 10 (FIG. 1), will define the route segment lines 14 and 16 (FIG. 2), and the slot 184 when projected as shown in FIG. 2, will define on the screen 10 the vernier deviation line 18. The flange 151 is mounted to the flange structure 153 by suitable bolts indicated at 157 of FIG. 8 so that the reticle holders 160 and 162 are retained in the slot 155.

Figure 9:
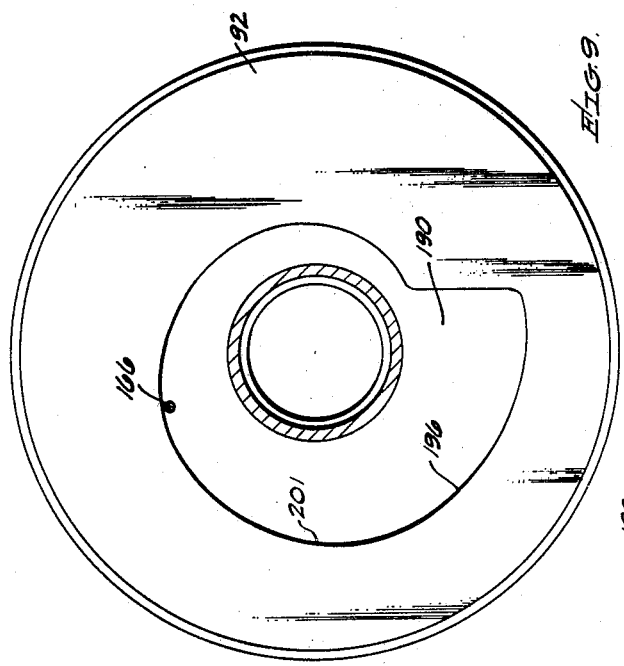
FIG. 9 is a sectional view taken at line 9—9 of FIG. 7.
Figure 10:
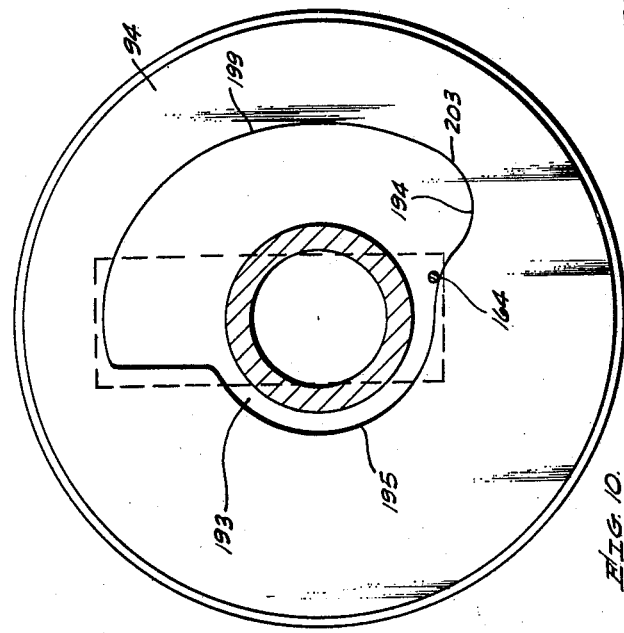
FIG. 10 is a sectional view taken at line 10—10 of FIG. 7.

Referring now principally to FIGS. 9 and 10, the cams 92 and 94 are formed of plates which define respective cam openings 190 and 193. The vernier deviation cam 92 has an internal surface 196 and the route segment cam 94 has an internal surface 194 on which respective pins 166 and 164 ride. Each surface 194 and 196 controls movement of the line on either side of the center or crossover point so that rapid rotation of the structure is not required. The value of R may have a positive and a negative value, for example, relative to a reference value to define the position relative to the center point of the display surface. The slope of the surface 194 is a selected multiple or function of the slope of the surface 196, such as five times the slope for the same amount of angular movement. Also in accordance with the invention, the slope of the surface 194 may be an exponential or any varying function of the slope of the surface 196 so that a small deviation of flight path is shown magnified at a greater proportional rate than a large deviation of flight path. A limit surface 195 and 199 of the cam 94 is provided so that no pin movement is provided along the slot and the vernier deviation indicator line will remain at the edge of the screen 10 for large flight position errors. During this condition only the route segment indicator will move outward in response to additional flight positional error. Points 201 and 203 are the center or crossover position of the surfaces 194 and 196. Limit surfaces are also provided on the cam 92 to limit the maximum movement of the route segment indicator line to the edge of the display surface. In the illustrated arrangement, the variation in rise and fall of the cam surfaces is such that the reticle holder 160 through moving in the same direction as the reticle holder 162, will consistently move at a rate that is five times greater than that of the reticle holder 162 (except at the limit). It will thus be apparent that any movement of the projected route segment segments 14 and 16 and vernier deviation indicator segment 18 on the screen 10 will be in identical direction from the center of the display, but the vernier segment 18 will have a movement that is clearly magnified. Thus, as shown in FIG. 2, the map is projected on the screen 10 at a changing position relative to the aircraft position indication 20 at the center of the screen so that the present position is presented on the display. The route segment indication lines are controlled to indicate the actual commanded or desired route relative to the projected map and relative to the present position symbol 20, with the vernier deviation indicator line 18 magnifying any error in aircraft deviation from the commanded route.

Referring now to FIG. 13, which is a schematic diagram of a frame 240 of the film or storage medium 27, the frame is indicated by a frame line 241. A projected terminal area chart is indicated generally as 242 and may include information relative to an approach path and the various available runways. The frame 240 may be manually selected by the operator or pilot by moving the manual thumbwheels 53 and 55 of FIG. 1 to control the servo circuits as shown in FIG. 4. Normal projection of the terminal area chart is provided on the display surface 10 as shown in FIG. 2. The map movement is automatically controlled by the computer 45 to provide a navigation display. Positioned on a first end of the frame 240 are data circles or segments 246, 247 and 248 and positioned at the other end of the frame 240 are data circles or segments 249, 250 and 251. Each of the data circles or segments 246 to 251 is of substantially the same diameter as the screen 10 of FIG. 2 so that all of any one circle or segment may be displayed at one time to the operator. Each data segment may be enclosed with a line such as 253 so that the operator is aided in displaying the segments in accordance with the invention. The segments or circles 246 to 251 may be segments or circles of approach and airport or of any reference data. The segment 246 may include instrument approach data, as shown, and the segment 247 may include airport data for a particular runway, as shown. The segment 248 may include visual omni-range data for use during that type of control. The segment 249 may include data on visual omni-range distance measuring equipment and the segment 250 may include data on an automatic direction finding approach. The segment 251 contains data on use of the instrument landing system. It is to be understood that this arrangement of data in the circular segments is only for illustrative purposes and the principles of the invention are applicable to any desired data being provided in the data segment positions. The data segments 246 to 251 allow a minimum amount of data to be included on the chart presentation 242 for ease of reading and allow data to be readily available to the operator on the same display surface and of the same overall format without the necessity of books, separate charts of information, or separate displays.

In operation, the pilot selects frames in response to the manual position control circuit of FIG. 4, each frame including only a chart or map such as one indicated at 242 of FIG. 13, which frame (not shown) may be utilized for normal navigation. For example, frames may be utilized containing only the chart information of low altitude and high altitude maps. During a terminal approach, a film frame such as 240 of FIG. 13 may be selected in accordance with the invention to display a portion of the terminal area chart 242, that is, the portion that is projected on the screen 10 of FIG. 2. The system automatically controls the map position and the position of the symbols 14 and 18 to aid in navigation. This navigation control display continues automatically in response to the computer 45 developing position and error signals, which type computer operation is well known in the art. When the operator desires certain data or reference data such as airport data, the switch 76 (FIG. 4) is pressed or energized to cause the system to terminate its automatic navigation display as the lamp 36 of FIG. 1 is deenergized in response to the switch contact 87. Thus, the symbols of lines 12 and 18 are inhibited from being displayed. As the switches 85 and 87 inhibit the computer 45 from controlling the film 27, the automatic map movement is terminated. Also, in arrangements in which the present aircraft position symbol 20 is projected or lighted, it may be inhibited or turned off in accordance with the invention. In the manual condition, with the two position switch 76 maintaining that condition, the operator moves the thumbwheels 53 and 55 so that the map 27 moves and the segment 247, for example, is displayed on the screen 10. When the operator has observed the data of the segment 247, he may either select another segment such as 250 by again moving the thumbwheels 53 and 55 or he may desire to return to automatic navigation control. By releasing or moving the switch 76, the lamp 36 (FIG. 1) is again energized, the symbols 12 and 18 are again displayed, and the symbols from the resolver 60 are again applied to the servo motor in both the X and Y dimension to control the map position. If the aircraft symbol or any other symbols or sources of illumination have been deenergized, they are energized as the system goes back into an automatic navigation display. Thus, the approach and airport data segments have been read and the system has been returned to navigation control with a minimum of effort, and all on the same display surface 10. Through the utilization of the terminal area and instrument approach data provided on the display 10 in addition to the normal approach aid chart, the operator has a highly flexible and functional navigational assistance capability. Because the full display screen is utilized for the reference data, clear and easily readable presentations are provided. It is to be understood that although the system is illustrated relative to the terminal portion of a route, the principles of the invention are equally applicable to any portion of a navigation route and to providing any additional or reference data.

It is to be noted that the principles of the invention are not limited to six area segments on a frame but that any desired and suitable number of circular segments may be provided. Also, the segments are not limited to circular but may be any shape consistent with the configuration of the display surface.

Thus, there has been described an approach aid display system that makes available on a single display a combination of a terminal area chart presentation and a series of individual reference charts or reference tables such as instrument approach charts provided on the same frame. The system of the invention allows the operator to assume manual control of chart positioning and the symbol presentation to obtain necessary reference data and then to readily return to automatic navigation control. The use of the approach data or reference data segments provides information to the operator that has conventionally been available only through paper charts. The combination of terminal area and approach data on a single film segment or frame and the presentation with the same overall format on the same display surface, significantly reduces operator search and selection requirements in obtaining approach reference data. The arrangement in accordance with the invention of each single terminal area chart, provides a large amount of information in a highly centralized format or display surface. The system provides a high degree of accessibility to the terminal area and instrument approach data through operator selection of automatic or manual chart positioning. It is to be understood that the principles of the invention are applicable to any type of navigation or route control such as aircraft, ships or submarines. Also, the principles of the invention are not limited to terminal area operation but include presentation of data during any portion of a course or route.

What is claimed is:

1. In an aircraft navigation system of the type having a navigation computer and a display surface with a center position, an improvement comprising first means including a film projector having a film of maps with a plurality of frames for projecting a portion of a frame on said display surface, second means for projecting navigation symbols on said display surface, third means coupled to said computer and to said first means for moving said film to selected film frames, fourth means coupled to said computer and to said first means for automatically moving the film so that the map of the selected frame is maintained at positions relative to the center of the display representative of present position of said aircraft, fifth means coupled to said first means and having manual controls for moving said film within a map frame to selected positions, sixth means coupled to said second means for deenergizing the projection of said navigation symbols, and switching means coupled to said fourth, fifth and sixth means for controlling said fourth means to terminate said automatic control, said fifth means for energizing said manual controls and said sixth means for terminating the projection of said navigation symbols.

2. A flight navigation display system comprising
a display unit having a surface with a center point,
first means including a film projector for film of a plurality of frames to project a selected portion of a selected frame on said display surface at one time, said frames including navigation maps and terminal maps, said terminal map frames having data regions thereon equal in area to said selected portion,
second means for projecting a route indicating symbol on said display surface,
third means coupled to said first means for automatically moving said map frame to display selected portions of said map relative to said center point,
fourth means coupled to said first means having manual controls for moving said map within a frame to selected positions,
fifth means coupled to said second means for deenergizing the projection of said route indicating symbol, and
control means coupled to said third, fourth and fifth means to terminate said automatic control, to energize said manual control and to terminate said navigation symbols for displaying said data regions.

3. The combination of claim 2 further including computer means coupled to said second and third means to control the positioning of the symbols and the portion of the map frame on said display surface during automatic control.

4. In a navigation system of the type including a display unit with a display surface having a center point representing the position of an aircraft, said navigation system further including first means for displaying a line indication at a distance from said center point which corresponds to a selected route to be followed, and second means including means storing a plurality of maps for selectively and controllably displaying one of the stored maps on said surface with the point on the map which represents the aircraft present position being displayed at said center point, said map including a plurality of frames of navigation maps or terminal area maps, said terminal area maps including data areas thereon, an improvement comprising
computer means,
third means coupled to said second means and to said computer means for selecting a frame,
fourth means coupled to said computer means and to said second means for automatically moving the map of a selected frame so that the aircraft present position is displayed at said center,
fifth means coupled to said second means for providing manual control of said map position within a selected frame, and
switch means coupled to said fourth and fifth means and to said first means for providing manual selection of said data areas through said fifth means.

5. In an aircraft navigation system of the type having a computer and a display means with a display surface, said display surface having a center point, an improvement comprising
first means including a film projector for moving a film to selected frames and for projecting a portion of a selected frame on said display surface and having motor means for moving said film relative to said display surface in a first direction parallel to the longitudinal axis of said film and in a second orthogonal direction relative to said display surface, said portion of a selected frame having a predetermined size, said frames providing navigation charts or terminal area charts, said frames of terminal area charts including data segments having areas of said predetermined size,
second means coupled to said computer and to the motor means of said first means for moving said film in said first direction to selected film frames,
third means coupled to said computer and to the motor means of said first means for automatically moving said film holding means in said first and second direction within a frame so that the film of the selected frame is positioned so that the projected chart position relative to the center of the display represents present position of said aircraft,
fourth means coupled to the motor means of said first means and having manual controls for moving said map in said first and second directions within a frame to selected positions, and
control means coupled to said third and fourth means for terminating control by said third means and energizing said fourth means for moving said film to project said data segments.

References Cited

UNITED STATES PATENTS

| | | |
|---|---|---|
| 2,169,532 | 8/1939 | Jensen _____ 73—178 XR |
| 2,314,497 | 3/1943 | Hargrave et al. ____ 73—178 XR |
| 2,423,513 | 7/1947 | Meyer. |
| 2,608,094 | 8/1952 | Best. |
| 2,637,848 | 5/1953 | Cunningham. |
| 2,960,906 | 11/1960 | Fogel. |

NORTON ANSHER, Primary Examiner
R. P. GREINER, Assistant Examiner

U.S. Cl. X.R.

73—178; 116—129; 343—107; 353—13